United States Patent
Bieker et al.

(10) Patent No.: US 6,710,312 B2
(45) Date of Patent: Mar. 23, 2004

(54) HEATING JACKET ASSEMBLY WITH FIELD REPLACEABLE THERMOSTAT

(75) Inventors: Lisa Bieker, Columbus, OH (US); Michael J. Neal, Columbus, OH (US)

(73) Assignee: B H Thermal Corporation, Columbus, OH (US)

( * ) Notice: Subject to any disclaimer, the term of this patent is extended or adjusted under 35 U.S.C. 154(b) by 142 days.

(21) Appl. No.: 10/124,208

(22) Filed: Apr. 12, 2002

(65) Prior Publication Data

US 2003/0192875 A1 Oct. 16, 2003

(51) Int. Cl.[7] .................................................. H05B 3/34
(52) U.S. Cl. ........................................ 219/528; 219/535
(58) Field of Search ................................. 219/528, 535

(56) References Cited

U.S. PATENT DOCUMENTS

| | | | | |
|---|---|---|---|---|
| 3,597,591 A | * | 8/1971 | Van Derlip | 219/528 |
| 3,999,037 A | * | 12/1976 | Metcalf, Sr. | 219/211 |
| 4,065,660 A | * | 12/1977 | Berard | 219/535 |
| 4,278,876 A | * | 7/1981 | Savoca et al. | 219/535 |
| 4,281,238 A | * | 7/1981 | Noma et al. | 219/535 |
| 4,314,144 A | * | 2/1982 | Wojtecki et al. | 219/528 |
| 4,372,028 A | * | 2/1983 | Clark et al. | 29/460 |
| 4,628,184 A | * | 12/1986 | West | 392/441 |
| 4,632,792 A | * | 12/1986 | Clark | 264/45.2 |
| 4,701,598 A | * | 10/1987 | Cooper | 219/535 |
| 4,950,868 A | * | 8/1990 | Moss et al. | 219/211 |
| 5,023,031 A | * | 6/1991 | West et al. | 264/46.5 |
| 5,883,364 A | | 3/1999 | Frei | |
| 6,049,062 A | * | 4/2000 | Jones | 219/211 |

* cited by examiner

Primary Examiner—Edward K. Look
Assistant Examiner—Vinod D. Patel
(74) Attorney, Agent, or Firm—Porter, Wright, Morris & Arthur, LLP

(57) ABSTRACT

A heating jacket for use on a processing vessel includes a flexible heater jacket having a plurality of layers, a flexible heating element positioned within the layers, and a thermostat positioned within the layers and electrically connected to the heating element for regulating the heating element. An access opening is formed in at least one of the layers to provide access to the thermostat positioned within the layers. An access cover includes a pivotable inner cover which selectively covers the access opening and an outer cover which selectively covers the inner cover. A mounting bracket of the thermostat extends below a pair of parallel flexible strips to secure the thermostat to the layers whereby the thermostat is readily replaceable in the field.

22 Claims, 5 Drawing Sheets

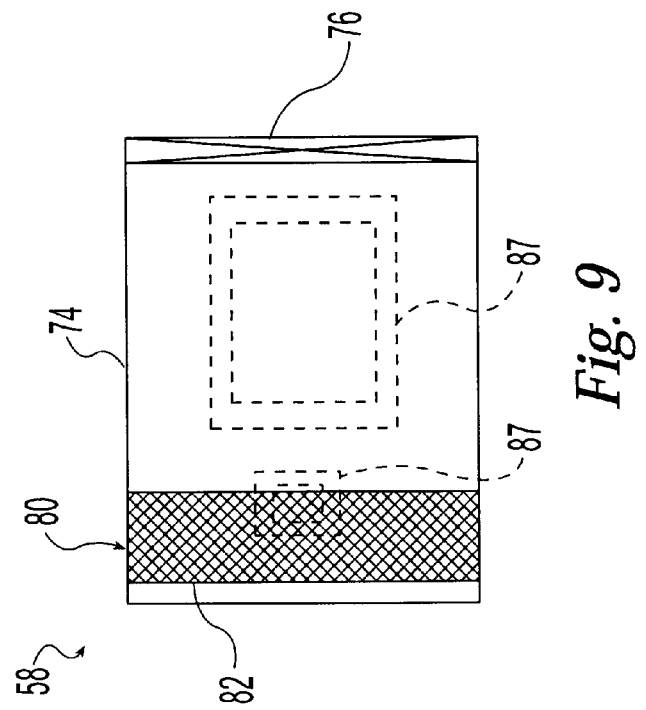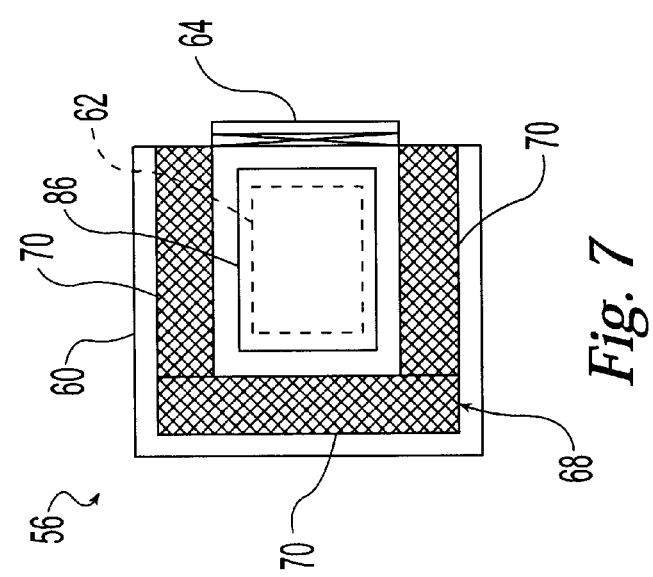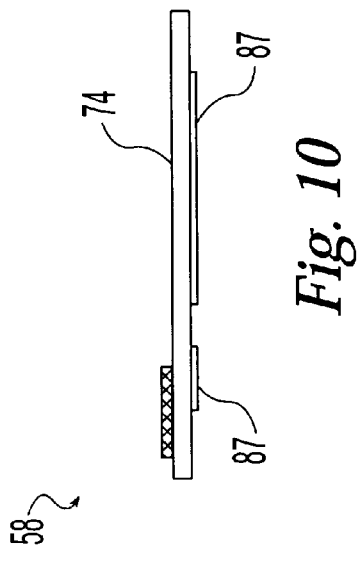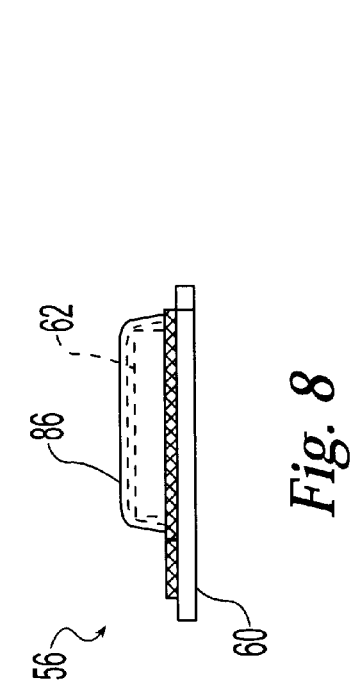

HEATING JACKET ASSEMBLY WITH FIELD REPLACEABLE THERMOSTAT

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to electrical resistance heating apparatus and, more particularly, to flexible heaters having field replaceable thermostats.

BACKGROUND OF THE INVENTION

In many processing industries, it is advantageous to heat contents such as fluids located within vessels such as pipes, ducts, conduits, and the like. Often, a flexible heater such as a heating jacket, is disposed about the vessel so that, when activated, the flexible heater elevates the temperature of the vessel and thus the contents located therein. The heating jacket typically includes a flexible heating element enclosed in multiple layers of flexible high temperature cloth and insulation. The heating jacket can also include a thermostat enclosed within the layers to regulate the temperature of the heating element.

While these heating jackets perform their intended purpose, their life can be limited by the failure of the thermostat. When the thermostat fails, the heating jacket must be removed and replaced. While the heating jacket may be returned to the producer for replacement of the thermostat, time and resources must be expended to remove, repair, and replace the heating jacket. Additionally, spare heating jackets must be available for immediate use if down time of the processing equipment is to be minimized. Accordingly, there is a need in the art for an improved flexible heater wherein the thermostat is replaceable in the field.

SUMMARY OF THE INVENTION

In accordance with one aspect of the present invention a heating jacket for use on a processing vessel includes a flexible heater jacket having a plurality of layers, a flexible heating element positioned within the layers, and a thermostat positioned within the layers and electrically connected to the heating element for regulating the heating element. An access opening is formed in at least one of the layers to provide access to the thermostat positioned within the layers. An access cover is moveable to selectively cover and uncover the access opening whereby the thermostat is replaceable by uncovering the access opening.

According to another aspect of the present invention, a heating jacket includes a flexible heater jacket having a plurality of layers, a flexible heating element positioned within the layers, and a thermostat positioned within the layers and electrically connected to the heating element for regulating the heating element. An access opening is formed in at least one of the layers to provide access to the thermostat positioned within the layers. An inner cover selectively covers and uncovers the access opening and an outer cover selectively covers and uncovers the inner cover.

According to yet another aspect of the present invention, a heating jacket includes a flexible heater jacket having a plurality of layers, a flexible heating element positioned within the layers, and a thermostat positioned within the layers and electrically connected to the heating element for regulating the heating element. A pair of generally parallel strips are secured to the layers. The thermostat has a mounting bracket extending below the strips to secure the thermostat to the layers.

According to even yet another aspect of the present invention, a method of replacing a thermostat of a heating jacket for use on a processing vessel includes the step of providing a heating jacket having a flexible heater jacket with a plurality of layers, a flexible heating element positioned within the layers, a thermostat positioned within the layers and electrically connected to the heating element for regulating the heating element, and an access cover movable to selectively cover and uncover an access opening formed in at least one of the layers to provide access to the thermostat. The method also includes the steps of moving the access cover to uncover the access opening, replacing the thermostat while the access opening is uncovered, and moving the access cover to cover the access opening after the thermostat is replaced.

From the foregoing disclosure and the following more detailed description of various preferred embodiments it will be apparent to those skilled in the art that the present invention provides a significant advance in the technology and art of flexible heaters. Particularly significant in this regard is the potential the invention affords for providing a high quality, reliable, low cost, field repairable assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 7 is an enlarged side view of a inner cover or plug of the access cover of the heating jacket assembly of FIGS. 1 to 3;

FIG. 8 is an edge view of the plug of FIG. 7;

FIG. 9 is an enlarged side view of a outer cover or flap of the access cover of the heating jacket assembly of FIGS. 1 to 3; and FIG. 10 is an edge view of the flap of FIG. 9.

Figure 1:
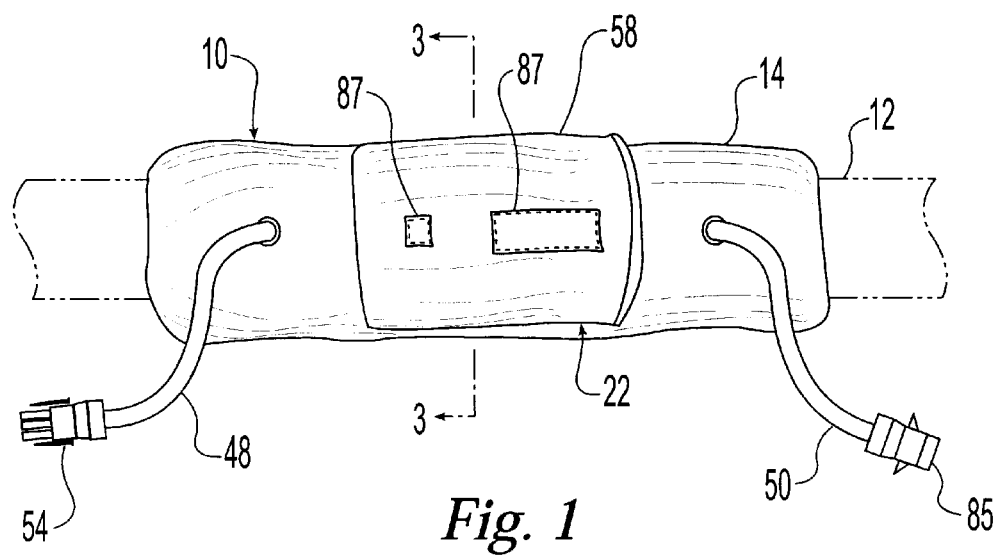
FIG. 1 is a perspective view of a heating jacket assembly according to the present invention which is disposed about a processing vessel.

It should be understood that the appended drawings are not necessarily to scale, presenting a somewhat simplified representation of various preferred features illustrative of the basic principles of the invention. The specific design features of a heating jacket assembly as disclosed herein, including, for example, specific dimensions, orientations, and shapes of the heater jacket layers and the flexible heating element will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the heating jacket assembly illustrated in the drawings. In general, up or upward refers to an upward direction within the plane of the paper in FIG. 1, and down or downward refers to a downward direction within the plane of the paper in FIG. 1. Also in general, vertical refers to an upward/downward direction within the plane of the paper in FIG. 1 and horizontal refers to a left/right direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved heating jacket assembly disclosed herein. The following detailed discussion of various alternative and preferred embodiments will illustrate the general principles of the invention with reference to a heating jacket assembly suitable for use with a processing vessel in the form of a cylindrical pipe. Other embodiments suitable for other applications will be apparent to those skilled in the art given the benefit of this disclosure.

Figure 2:
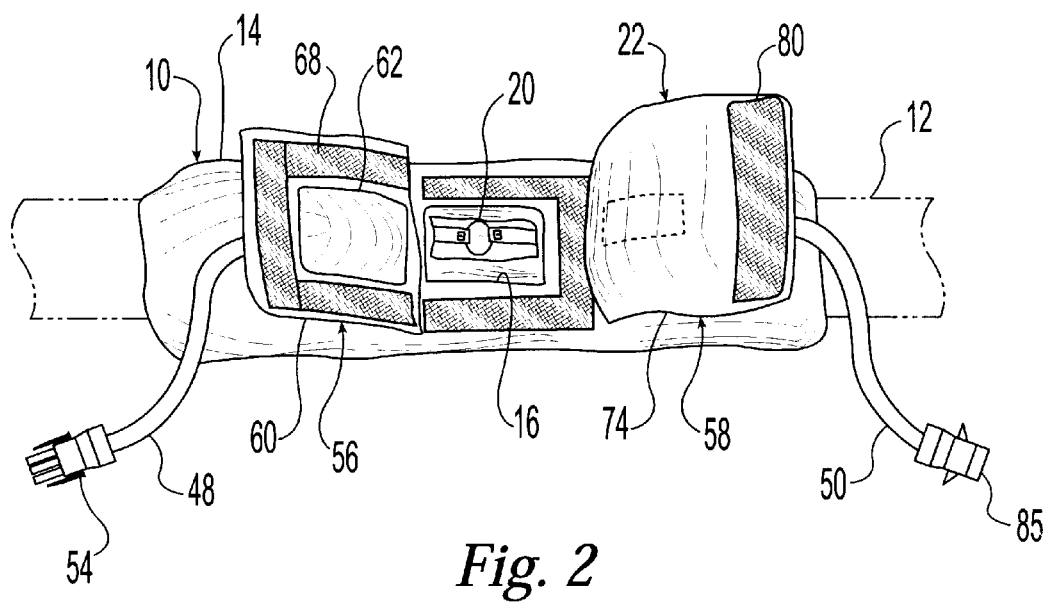
FIG. 2 is a perspective view of the heating jacket assembly of FIG. 1 wherein an access cover is open to expose an access opening which provides access to a thermostat.
Figure 3:
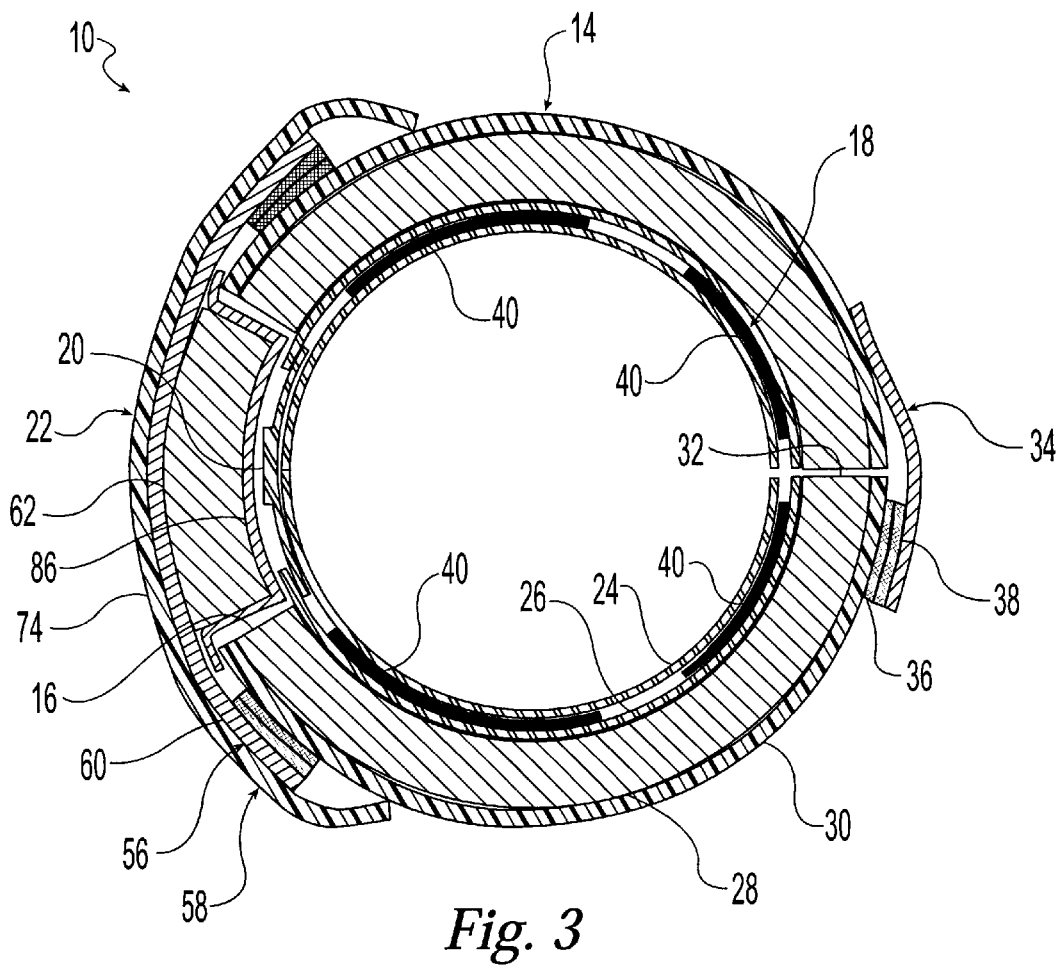
FIG. 3 is an enlarged cross-sectional view of the heating jacket assembly of FIG. 1 taken along line 3=13 3 of FIG. 1 wherein the processing vessel is removed for clarity.

Referring now to the drawings, FIGS. 1 to 3 illustrate a heating jacket assembly 10 according to the present invention which is disposed about a portion of a processing vessel 12 to be heated. The heating jacket assembly 10 includes a flexible, multi-layer main body or heater jacket 14 having an access opening 16, a flexible heating element 18, a thermostat 20 for regulating the heating element 18 and which is accessible through the access opening 16, and an access cover 22 selectively closing and opening the access opening 16.

The heater jacket 14 includes a flexible inner liner or layer 24, a flexible intermediate liner or layer 26 located radially outward of the inner liner 24, a flexible insulative layer 28 located radially outward of and directly contacting the intermediate liner 26, and a flexible cover layer 30 located radially outward of and directly contacting the insulative layer 28. The heating element 18 is located between and directly contacting the inner and intermediate liners 24, 26 such that the intermediate liner 26 is located between the heating element 18 and the insulative layer 28. The inner liner 24, the intermediate liner 26, and the cover layer 30 are each preferably formed of a high-temperature, man-made, multi-filament sheet structure, that is, cloth or fabric. The cloth can be formed of any high-temperature material which is suitable for the temperature range of the application such as, for example, NOMEX, a product of E.I. Du Pont de Nemours and Company of Wilmington, Del., and fiberglass cloth available from Alpha Associates, Inc. of Palantine, Ill. The insulative layer 28 is formed of a high-temperature, insulative material suitable for the temperature range of the application. A suitable insulative material is fiberglass insulation such as, for example, Insulbatte/Tempmat available from Great Lakes Textiles, Inc. of Walton Hills, Ohio. It is noted that depending on the properties of the heating element 18 and the insulative layer 28, the intermediate layer may be eliminated.

The layers 24, 26, 28, 30 of the heater jacket 14 are stitched or sewn together or secured together in any other suitable manner so that the heater jacket 14 generally conforms to the shape of the processing vessel 12 to be heated. The illustrated heater jacket 14 is generally tubular-shaped having opposed open ends so that processing vessel 12 extends through the heater jacket 14 with the heater jacket 14 encircling the processing vessel 12. Disposed in this manner, the inner liner 24 of the heater jacket 14 is disposed directly adjacent the outer surface of the processing vessel 12.

The illustrated heater jacket 14 has an opening or slit 32 formed through each of the layers 24, 26, 28, 30 and extending the length of the heater jacket 14 to form opposed free edges of the layers 24, 26, 28, 30. The slit 32 allows the heater jacket 14 to be readily installed on and removed from the processing vessel 12. Preferably, a readily releasable, cooperative fastener 34 secures the free edges together when the heater jacket 14 is installed. The illustrated fastener 34 is a flap preferably of the same material as the cover layer 30. One side of the flap 34 is sewn or otherwise secured to the cover layer 30. The opposing side of the flap 34 has a strip 38 of VELCRO type loop material sewn or otherwise secured to the flap 34. The strip 38 of loop material releasably mates to a strip 36 of VELCRO type hook material that is sewn or otherwise secured to the cover layer 30. The flap 34 extends across the slit 32 to connect the free edges of the heater jacket 14 in a readily releasable manner. It is noted that other types and configurations of releasable fasteners 34 can be utilized within the scope of the present invention.

The flexible heating element 18 is located directly adjacent the inner liner 24 so that only the inner liner 24 separates the heating element 18 from the outer surface of the processing vessel 12. The illustrated heating element 18 includes four tape sections 40. Each tape section 40 is constructed of bundled resistance wires which are knitted into serpentine tape form The tape sections 40 longitudinally extend the length of the heater jacket 14 and are circumferentially spaced-apart about the outer surface of the inner liner 24 in parallel relation to one another. Suitable tape sections 40 are described in U.S. Pat. No. 5,883,364, the disclosure of which is expressly incorporated herein in its entirety by reference. It is noted, however, that other suitable heating elements 18 can be utilized within the scope of the present invention. The tape sections 40 are preferably stitched to the inner liner 24 or secured in any other suitable manner. Preferably, insulated bridge connectors electrically interconnect the tape sections 40 together.

Figure 2A:
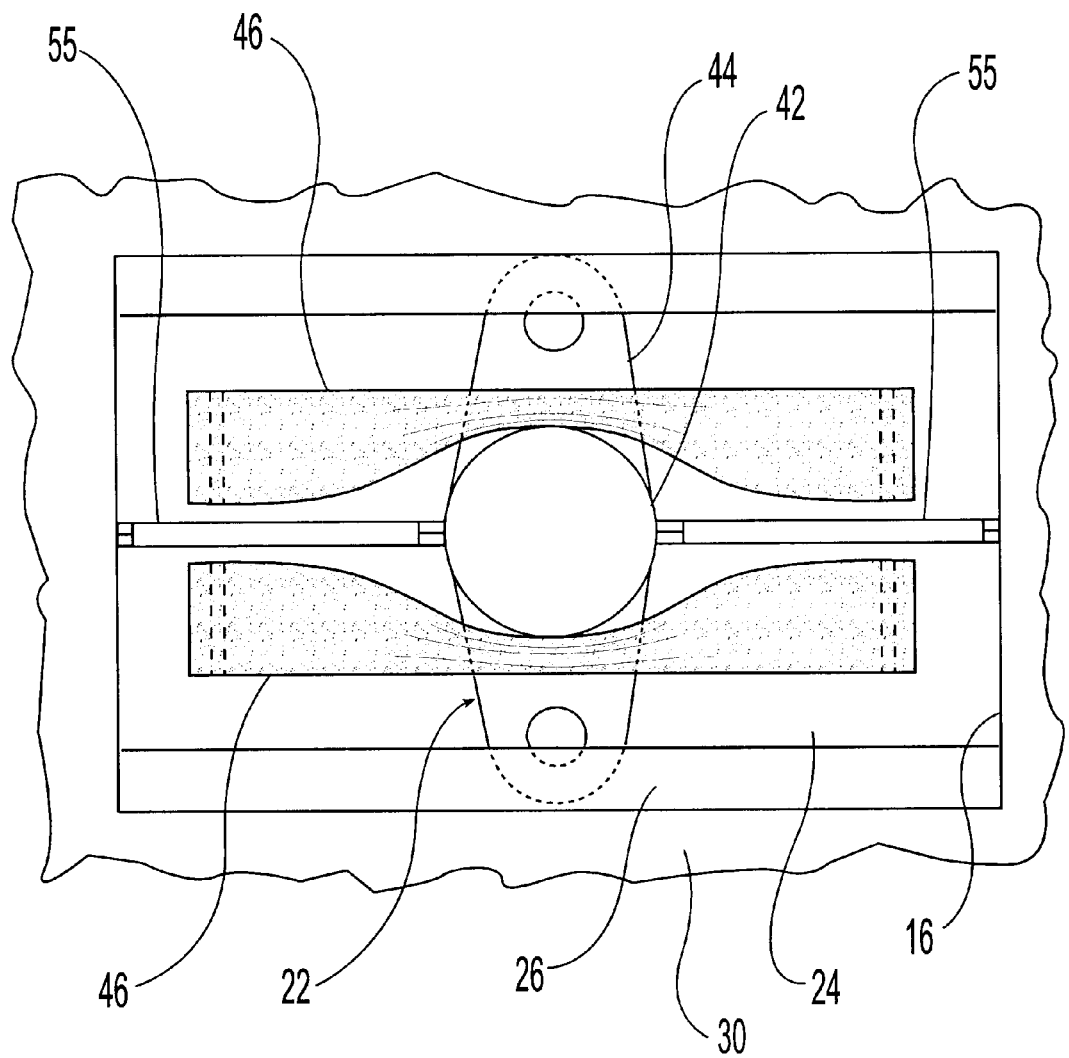
FIG. 2A is an enlarged fragmented view showing a portion of FIG. 2 in the area of the access opening.

The thermostat 20 is electrically connected to the heating element 18 to regulate the temperature of the heating element 18. The illustrated thermostat 20 is a disc bimetal thermostat but any suitable thermostat 20 can be utilized within the scope of the present invention. A suitable disc bimetal thermostat is available from Thermo-o-Disc, Inc. of Mansfield, Ohio. As best shown in FIG. 2A, the illustrated thermostat 20 has a disc-shaped body 42 and a generally planar mounting bracket 44 secured to the body 42 and extending beyond opposed sides of the body 42. It is noted that the illustrated mounting bracket 44 is provided with openings for attachment of the mounting bracket 44 with mechanical fasteners but these openings are not utilized in the illustrated embodiment.

The thermostat 20 is located directly adjacent the inner liner 24 so that only the inner liner 24 separates the thermostat 20 from the outer surface of the processing vessel 12. The illustrated thermostat 20 is located on the opposite side of the processing vessel 12 from the slit 32. The thermostat 20 is preferably secured to the inner liner 24 in any suitable manner. The illustrated thermostat 20 is secured in a readily releasable manner by two laps or strips 46 of flexible material. The strips 46 are each generally elongate and located in a parallel and spaced apart manner. The strips 46 are stitched or otherwise suitably secured to the inner liner 24 at each end of each strip 46. The strips 46 remain unsecured between attached ends so that with the inner liner 24 the strips 46 form flexible loops. Secured in this manner, the strips 46 and the inner liner 24 form a pair of adjacent, parallel, and spaced-apart flexible loops. The flexible material of the strips 46 is preferably a fabric or cloth comprised of fiberglass. A suitable material for the strips 46 is cloth sleeving typically used for covering wires and available from Markel Corp. of Norristown Pa. The thermostat 20 is secured by positioning the thermostat 20 between the strips 46 with the mounting bracket 44 extending generally parallel to the strips 46 and then rotating the thermostat 20 about 90 degrees while inserting the ends of the mounting bracket 44 below the strips 46, that is between the inner liner 24 and the strips 46, and into the loops formed by the strips 46. Once rotated, the thermostat 20 is secured to the inner liner 24 by the strips 46. With the thermostat 20 mounted in this manner, the heater jacket 14 maintains its flexibility and the thermostat 20 can be readily removed from the heater jacket 14 without the aid of tools, special training, or excessive time.

Figure 4:
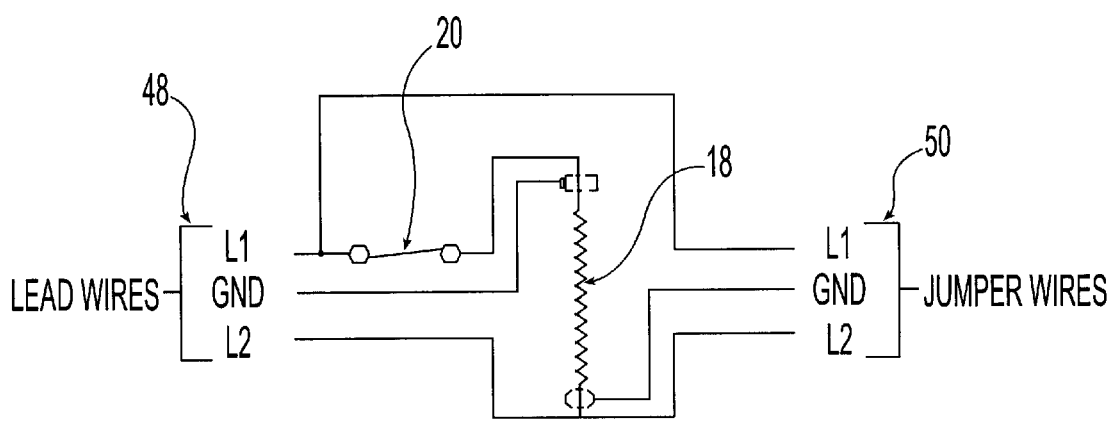
FIG. 4 is schematic diagram of an electrical circuit of the heating jacket assembly of FIGS. 1 to 3.
Figure 6:
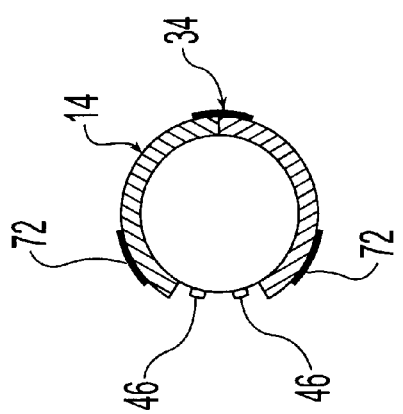
FIG. 6 is an end view of the heater jacket of FIG. 5.
Figure 5:
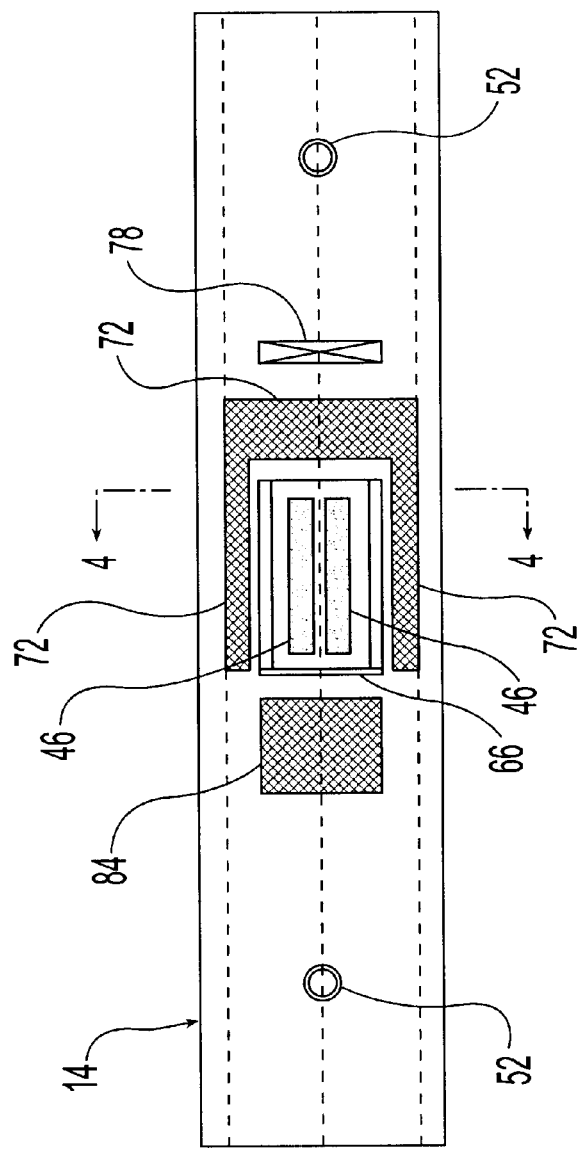
FIG. 5 is an enlarged side view of a heater jacket of the heating jacket assembly of FIGS. 1 to 3.

As best shown in FIG. 4, the heating element 18 and the thermostat 20 are preferably electrically connected with lead wires 48 and jumper wires 50. Assembled in this manner, the heating jacket assembly 10 is electrically connectable to other heating jacket assemblies 10 in a chain-like manner. As best shown in FIG. 5, a pair openings 52 are provided in the heater jacket 14 through the cover layer 30, the insulative layer 28, and the intermediate liner 26 so that the lead wires 48 and jumper wires 50 can extend to the heating element 18 and the thermostat 20. The outer ends of the lead wires 48 and the jumper wires 50 are preferably provided with suitable connectors 54 and 85. As best shown in FIG. 2A, wires attached directly to the thermostat 20 and exposed by the access opening 16 are preferably covered by high-temperature sleeving 55. The sleeving 55 is preferably comprised of the same material as the strips 46.

As best shown in FIGS. 2, 3, 5 and 6, the heater jacket 14 forms the access opening 16 at a location in which the thermostat 20 can be accessed for replacement without disassembly the layers of the heater jacket 14 and without removal of the heater jacket 14 from the processing vessel 12. In the illustrated embodiment the access opening 16 is located directly outwardly of the thermostat 20 in the radial direction, that is, the thermostat 20 is located directly below a cavity formed by the access opening 16. The illustrated access opening 16 extends through each of the layers of the heater jacket 14 except for the inner liner 24 so that the access opening 16 is formed in the cover layer 30, the insulative layer 28, and the intermediate liner 26. The illustrated access opening 16 is rectangularly-shaped but other sized and shaped openings can be utilized within the scope of the invention. Preferably, the access opening 16 at the intermediate liner 26 is slightly smaller than in the other layers such that the bracket 44 of the thermostat 20 extends partially under the intermediate liner 26 to assist in securing the thermostat 20 to the inner liner 24. Formed in this manner, access to the thermostat 20 is provided so that the thermostat 20 can be readily installed and removed from the heater jacket 14.

The access cover 22 is sized and shaped to selectively close the access opening 16 so that heated and electrical components are not exposed through access opening 16 during operation of the heating jacket assembly 10. The illustrated access cover 22 includes an inner cover or plug 56 covering the access opening 16 and an outer cover or flap 58 covering the inner cover 56. As best shown in FIGS. 7 and 8, the illustrated inner cover 56 includes a flexible main layer 60 and a flexible insulative layer 62. The main layer 60 is sized and shaped to overlay and entirely cover the access opening 16. The main layer 60 is preferably formed of a high-temperature, man-made, multi-filament sheet structure, that is, cloth or fabric. The main layer 60 preferably is formed of the same material as the cover layer 30 of the heater jacket 14. The illustrated insulative layer 62 is sized and shaped to extend within the access opening 16 when the main layer 60 is covering the access opening 16. The insulative layer 62 is preferably formed of a high-temperature insulative material such as, for example, a fiberglass insulation. The insulative layer 62 is preferably formed of the same material as the insulative layer 28 of the heater jacket 14. The insulative layer 62 is secured to the under side of the main layer 60 by a liner layer 86 which is sewn to the main layer 60. The liner layer 86 is preferably formed of the same material as the inner liner 24.

The inner cover 56 is preferably secured to the heater jacket 14 in a manner that is readily removable to provide access to the access opening 16. The illustrated inner cover 56 has a hinge portion 64 extending along one edge of the main layer 60 which is secured to the heater jacket 14 at an area 66 (FIG. 5) located near one side of the access opening 16, and preferably contiguous with one side of the access opening 16. The hinge portion 64 can be secured to the heater jacket 14 by stitching or other suitable manner. Secured in this manner the hinge portion 64 forms a living or integral hinge about which the inner cover 56 pivots between a closed position wherein the inner cover 56 covers the access opening 16 to close the access opening 16 (shown in FIG. 1) and an open position wherein the inner cover 56 does not cover the access opening 16 so that the thermostat 20 can be accessed through the access opening 16 (shown in FIG. 2).

The inner cover 56 is also preferably provided with a readily releasable fastener 68 to secure or hold the inner cover 56 in the closed position. The illustrated fastener 68 is VELCRO type loop material wherein strips 70 of loop material are sewn or otherwise attached to the underside of the main layer 60 and cooperating strips 72 (FIG. 5) of hook material are sewn or otherwise secured to the cover layer 30 of the heater jacket 14 to connect the inner cover 56 to the cover layer 30 in a readily releasable manner. It is noted that other types of readily releasable fasteners 68 can be utilized within the scope of the present invention. The illustrated strips 70 of loop material are secured to the main layer 60 in a U-shaped manner about the three sides of the insulative layer 62 other than the side where the hinge portion 64 is located. The illustrated cooperating strips 72 of hook material are secured to the cover layer 30 in a U-shaped manner about the three sides of the access opening 16 other than the side where the hinge area 66 of the inner cover 56 is located (best shown in FIG. 5). Secured in this manner, the inner cover 56 is attached to the cover layer 30 of the heater jacket 14 along each of the four sides of the access opening 16 when in the closed position.

As best shown in FIGS. 9 and 10, the illustrated outer cover 58 includes a flexible main layer 74. The main layer 74 is sized and shaped to overlay and entirely cover the inner cover 56. The main layer 74 is preferably formed of a high-temperature man-made, multi-filament sheet structure, that is, cloth or fabric. The main layer 74 preferably is formed of the same material as the cover layer 30 of the heater jacket 14.

The outer cover 58 is preferably secured to the heater jacket 14 in a manner that is readily removable to provide access to the access opening 16. The illustrated outer cover 58 has a hinge portion 76 extending along one edge of the main layer 74 which is secured to the heater jacket 14 at an area 78 (FIG. 5) near one side of the access opening 16 on the side of the access opening 16 opposite the side where the inner cover 56 is secured. The hinge portion 76 can be secured the heater jacket 14 by stitching or other suitable manner. Secured in this manner the hinge portion 76 forms a living or integral hinge about which the outer cover 58 pivots between a closed position wherein the outer cover 58 covers the inner cover 56 so that the inner cover 56 cannot be opened to its open position (shown in FIG. 1) and an open position wherein the outer cover 58 does not cover the inner cover 56 so that the inner cover 56 can be opened to its open position (shown in FIG. 2). Constructed in this manner, the outer cover 58 pivots in the opposite direction relative to the inner cover 56.

The outer cover 58 is also preferably provided with a readily releasable fastener 80 to secure or hold the outer cover 58 in the closed position. The illustrated fastener 80 is a VELCRO type fastener wherein a strip 82 of loop material is sewn or otherwise attached to the underside of the main layer 74 and a cooperating strip 84 (FIG. 5) of hook material is sewn or otherwise secured to the cover layer 30 of the heater jacket 14 to connect the outer cover 58 to the cover layer 30 in a readily releasable manner. It is noted that other types or configurations of releasable fasteners 80 can be utilized within the scope of the present invention. The illustrated strip 82 of loop material is secured to the main layer 74 near a side opposite the side where the hinge portion 76 is located. The illustrated cooperating strip 84 of hook material is secured to the cover layer 30 near the hinge area 66 of the inner cover 56 on a side of the hinge area 66 opposite the access opening 16. Secured in this manner, the outer cover 58 is secured to the cover layer 30 along opposite sides of the inner cover 56 when in the closed position.

The Illustrated outer cover 58 is also provided with flexible warning labels 87. The warning labels are sewn or otherwise secured to the outer surface of the main layer 74. The warning labels 87 are preferably provided with graphic and/or written indicia warning of high temperatures and/or live voltage to reduce the risk of the access cover being opened during operation of the heating jacket assembly 10.

The heating jacket assembly 10 is placed onto the processing vessel 12 by releasing the fastener 34 so that the slit 32 is freely enlargeable by flexing the layers of the heater jacket 14. When the slit 32 is enlarged enough to receive the processing vessel 12 therethrough, the heater jacket 14 is placed over the processing vessel 12 such that the processing vessel 12 passes through the slit 32 and into the central space formed by the inner liner 24 of the heater jacket. The fastener 34 is then reconnected so that the heater jacket 14 is secured to the processing vessel 12. With the heater jacket 14 secured on the processing vessel 12 in this manner, the processing vessel 12 passes through the heater jacket 14 with the inner liner 24 directly contacting the outer surface of the processing vessel 12. Voltage is then supplied to the heating element 18 via the lead wires 48 to produce heat which transfers from the heating element to the processing vessel 12 through the inner liner 24. The thermostat 20 regulates the temperature of the heating element 18 to provide a desired temperature.

If the thermostat 20 fails, all voltage to the heating jacket assembly is shut off and the heating element 18 is given a period of time to cool down to at or near ambient temperature. The outer cover fastener 80 is then released so that the outer cover 58 can be pivoted from the closed position to the open position. With the outer cover 58 in the open position, the inner cover 56 is exposed so that the inner cover fastener 62 can be released so that the inner cover 56 can be pivoted from the closed position to the open position. With the inner cover 56 in the open position, the access opening 16 is exposed with the thermostat 20 therein. The sleeving 55 is moved back so that the wires can be removed from the thermostat 20 and then the thermostat 20 is rotated about ninety degrees so that the mounting bracket 44 can be removed from underneath the strips 46. The failed thermostat 20 can then be disposed. A functional replacement thermostat 20 is then placed between the strips 46 with the mounting bracket 44 generally parallel to the strips 46 and rotated about ninety degrees so that the mounting bracket 44 extends below both of the strips 46 to secure the mounting bracket 44 to the inner liner 24. The wires are then connected to the thermostat 20 and the sleeving 55 is then moved back over the wires. The inner cover 56 is then pivoted from the open position to the closed position to cover the access opening 16 and the inner cover fastener 68 is secured to secure the inner cover 56 in the closed position. The outer cover 58 is then pivoted from the open position to the closed position and the outer cover fastener 80 is secured to secure the outer cover 58 in the closed position. The heating jacket assembly 10 can then be operated as discussed hereinabove.

It is apparent from the above description that the present invention provides an improved heating jacket assembly 10 which includes a field replaceable thermostat 20. The thermostat 20 can be removed and replaced while the heating jacket assembly 10 remains secured to, but loosened to relax the strips 46, the processing vessel 12 to minimize down time of the heating jacket assembly. It is noted that, when desired, the heating jacket assembly 10 can alternatively be removed from the processing vessel 12 to remove and replace the thermostat 20 in the field, that is, at the site of the processing vessel 12.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A heating jacket for use on a processing vessel, said heating jacket comprising, in combination:
a flexible heater jacket having a plurality of layers;
a flexible heating element positioned within the layers;
a thermostat positioned within the layers and electrically connected to the heating element for regulating the heating element;
wherein an access opening is formed in at least one of the layers to provide access to the thermostat positioned within the layers;
an access cover moveable to selectively cover and uncover the access opening; and
whereby the thermostat is replaceable by uncovering the access opening.

2. The heating jacket according to claim 1, wherein the access cover includes an inner cover movable to selectively cover the access opening and an outer cover movable to selectively cover the inner cover.

3. The heating jacket according to claim 1, further comprising a pair of generally parallel strips secured to the layers and wherein the thermostat has a mounting bracket extending below the strips to secure the thermostat to the layers.

4. A heating jacket for use on a processing vessel, said heating jacket comprising, in combination:
a flexible heater jacket having a plurality of layers;
a flexible heating element positioned within the layers;
a thermostat positioned within the layers and electrically connected to the heating element for regulating the heating element; and
wherein an access opening is formed in at least one of the layers to provide access to the thermostat positioned within the layers; and
an inner cover selectively covering and uncovering the access opening; and
an outer cover selectively covering and uncovering the inner cover.

5. The heating jacket according to claim 4, wherein the plurality of layers includes a cover layer and the inner cover is pivotally secured to the outer layer such that the inner cover is pivotable between a closed position wherein the inner cover covers the access opening and an open position wherein the access opening is uncovered by the inner cover.

6. The heating jacket according to claim 5, wherein the outer cover is pivotally secured to the outer layer such that the outer cover is pivotable between a closed position wherein the outer cover covers the inner cover and an open position wherein the inner cover is uncovered by the outer cover.

7. The heating jacket according to claim 6, wherein the inner cover and the outer cover are pivotable in opposite directions.

8. The heating jacket according to claim 5, wherein the inner cover is sewn to the outer layer to form a hinge.

9. The heating jacket according to claim 5, wherein the inner cover is provided with a releasable fastener to hold the inner cover in the closed position.

10. The heating jacket according to claim 4, wherein the plurality of layers includes a cover layer and the outer cover is pivotally secured to the outer layer such that the outer cover is pivotable between a closed position wherein the outer cover covers the inner cover and an open position wherein the inner cover is uncovered by the outer cover.

11. The heating jacket according to claim 10, wherein the outer cover is sewn to the outer layer to form a hinge.

12. The heating jacket according to claim 10, wherein the outer cover is provided with a releasable fastener to hold the outer cover in the closed position.

13. The heating jacket according to claim 4, wherein the inner cover entirely covers the access opening.

14. The heating jacket according to claim 13, wherein the outer cover entirely covers the inner cover.

15. A heating jacket for use on a processing vessel, said heating jacket comprising, in combination:
a flexible heater jacket having a plurality of layers;
a flexible heating element positioned within the layers;
a thermostat positioned within the layers and electrically connected to the heating element for regulating the heating element;
a pair of generally parallel strips secured to the layers; and
wherein the thermostat has a mounting bracket extending below the strips to secure the thermostat to the layers.

16. The heating jacket according to claim 15, wherein the strips are each secured to the layers at each end to from a pair of loops and the mounting bracket extends into each of the loops.

17. The heating jacket according to claim 15, wherein the strips comprise a flexible material.

18. The heating jacket according to claim 17, wherein the strips comprise cloth.

19. A method of replacing a thermostat of a heating jacket for use on a processing vessel, said method comprising the steps of, in combination:
(a) providing a heating jacket having a flexible heater jacket with a plurality of layers, a flexible heating element positioned within the layers, a thermostat positioned within the layers and electrically connected to the heating element for regulating the heating element, and an access cover movable to selectively cover and uncover an access opening formed in at least one of the layers to provide access to the thermostat;
(b) moving the access cover to uncover the access opening;
(c) replacing the thermostat while the access opening is uncovered; and
(d) moving the access cover to cover the access opening after step (c).

20. The method according to claim 19, wherein step (a) includes the step of providing the access cover with an inner cover moveable to selectively cover the access opening and an outer cover moveable to selectively cover the inner cover, step (b) includes the steps of moving the outer cover to uncover the inner cover and moving the inner cover to uncover the access opening, and step (d) includes the steps of moving the inner cover to cover the access opening and moving the outer cover to cover the inner cover.

21. The method according to claim 19, wherein step (a) includes the step of providing a pair of generally parallel strips secured to the layers, and step (c) includes the step of extending a mounting bracket of the thermostat below the strips to secure the thermostat to the layers.

22. The method according to claim 19, further comprising the step of securing the heating jacket on the processing vessel and wherein steps (b), (c), and (d) are performed while the heating jacket is secured to the processing vessel.

* * * * *